US012135039B2

(12) United States Patent
Beers et al.

(10) Patent No.: US 12,135,039 B2
(45) Date of Patent: Nov. 5, 2024

(54) VARIABLE PIPE DIFFUSER (71) Applicant: Hamilton Sundstrand Corporation, Charlotte, NC (US)

(72) Inventors: Craig M. Beers, Wethersfield, CT (US); Brent J. Merritt, Southwick, MA (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 76 days.

(21) Appl. No.: 17/942,971

(22) Filed: Sep. 12, 2022

(65) Prior Publication Data
US 2024/0084818 A1   Mar. 14, 2024

(51) Int. Cl.
F04D 29/44 (2006.01)
B64D 13/06 (2006.01)
F04D 15/00 (2006.01)
F04D 17/10 (2006.01)
F04D 29/46 (2006.01)

(52) U.S. Cl.
CPC ....... *F04D 29/441* (2013.01); *F04D 15/0022* (2013.01); *F04D 17/10* (2013.01); *F04D 29/464* (2013.01); *B64D 2013/0603* (2013.01); *B64D 2013/0618* (2013.01)

(58) Field of Classification Search
CPC ...... F01D 17/08; F01D 17/141; F01D 17/143; F01D 17/145; F01D 17/165; F01D 17/18; F04D 29/462; F04D 29/464; F04D 29/441; B64D 13/02; B64D 13/04; B64D 2013/0603; B64D 2013/0618; B64D 13/08

USPC ...................................................... 415/224.5
See application file for complete search history.

(56) References Cited

U.S. PATENT DOCUMENTS

| 2,648,195 | A |   | 8/1953  | Light et al. |
| 2,996,996 | A |   | 8/1961  | Kurt |
| 3,032,259 | A |   | 5/1962  | Kurt |
| 3,358,965 | A |   | 12/1967 | Kurt |
| 3,826,586 | A |   | 7/1974  | Richards |
| 3,841,789 | A |   | 10/1974 | Corrigan et al. |
| 4,292,807 | A |   | 10/1981 | Rannenberg |
| 4,302,150 | A | * | 11/1981 | Wieland ............... F04D 29/441 415/207 |
| 4,378,194 | A |   | 3/1983  | Bandukwalla |
| 4,460,310 | A |   | 7/1984  | Plunkett |
| 4,844,690 | A |   | 7/1989  | Delaurier et al. |
| 7,326,027 | B1 |  | 2/2008  | Skoch et al. |

(Continued)

FOREIGN PATENT DOCUMENTS

| DE | 102011120167 A1 | 6/2013 |
| EP | 2602191 B1 | 5/2016 |

(Continued)

OTHER PUBLICATIONS

Extended European Search Report for EP Application No. 23196768.8, dated Jan. 23, 2024, 8 pages.

(Continued)

Primary Examiner — Christopher Verdier
(74) Attorney, Agent, or Firm — Kinney & Lange, P.A.

(57) ABSTRACT

A variable diffuser includes a backing plate, a shroud, a diffuser body between the backing plate and the shroud, a plurality of passages through the diffuser body, and a valve adjacent to the shroud and the diffuser body. The valve movably occludes a portion of the plurality of passages.

19 Claims, 7 Drawing Sheets

(56) References Cited

U.S. PATENT DOCUMENTS

| | | |
|---|---|---|
| 8,689,552 B2 | 4/2014 | Iwata |
| 9,212,667 B2 | 12/2015 | Sun et al. |
| 10,378,553 B2 | 8/2019 | Sommer et al. |
| 10,753,370 B2 | 8/2020 | Hall et al. |
| 11,125,247 B2 | 9/2021 | Drolet |
| 2003/0059301 A1* | 3/2003 | Izumi .................... F04D 29/444 <br> 415/208.3 |
| 2010/0166539 A1 | 7/2010 | Ibaraki et al. |
| 2011/0103938 A1 | 5/2011 | Holroyd et al. |
| 2011/0194929 A1 | 8/2011 | Denholm et al. |
| 2012/0251298 A1 | 10/2012 | Moore et al. |
| 2013/0064682 A1 | 3/2013 | Sun et al. |
| 2014/0328667 A1 | 11/2014 | Sommer et al. |
| 2017/0167292 A1 | 6/2017 | Army et al. |
| 2018/0355890 A1 | 12/2018 | Sishtla |
| 2021/0348622 A1 | 11/2021 | Liu et al. |
| 2023/0184131 A1* | 6/2023 | Murray .................... F02C 7/32 <br> 60/785 |

FOREIGN PATENT DOCUMENTS

| | | |
|---|---|---|
| EP | 2484590 B1 | 4/2018 |
| EP | 4015832 A1 | 6/2022 |
| JP | S60132099 A | 7/1985 |
| JP | H09100799 A | 4/1997 |
| JP | 2009068431 A | 4/2009 |
| JP | 5148425 B2 | 12/2012 |
| JP | 2014118925 A | 6/2014 |

OTHER PUBLICATIONS

Extended European Search Report for EP Application No. 23196994.0, dated Jan. 24, 2024, 9 pages.

Extended European Search Report for EP Application No. 23196913.0, dated Jan. 26, 2024, 10 pages.

Extended European Search Report for EP Application No. 23195497.5, dated Jan. 24, 2024, 8 pages.

* cited by examiner

VARIABLE PIPE DIFFUSER

BACKGROUND

The present disclosure relates to aircraft environmental control systems. More specifically, the present disclosure relates to a valve for a variable diffuser in a cabin air compressor.

Air cycle machines are used in environmental control systems in aircraft to condition air for delivery to an aircraft cabin. Conditioned air is air at a temperature, pressure, and humidity desirable for aircraft passenger comfort and safety. At or near ground level, the ambient air temperature and/or humidity is often sufficiently high that the air must be cooled as part of the conditioning process before being delivered to the aircraft cabin. At flight altitude, ambient air is often far cooler than desired, but at such a low pressure that it must be compressed to an acceptable pressure as part of the conditioning process. Compressing ambient air at flight altitude heats the resulting pressured air sufficiently that it must be cooled, even if the ambient air temperature is very low. Thus, under most conditions, heat must be removed from air by the air cycle machine before the air is delivered to the aircraft cabin.

A cabin air compressor can be used to compress air for use in an environmental control system. The cabin air compressor includes a motor to drive a compressor section that in turn compresses air flowing through the cabin air compressor. A variable diffuser is also positioned in the cabin air compressor. A variable diffuser typically requires a plurality of vanes that are configured to pivot about a point to vary the size of a gap between adjacent vanes to vary the flow of air through the diffuser. The plurality of vanes typically pivot against a shroud or a backing plate of the variable diffuser. Moving the vanes against the backing plate or the shroud increases wear on the vanes, leading to more repairs. Further, a traditional variable diffuser has many vanes and each vane requires multiple parts to move. High part counts increase the cost of building and maintaining the variable diffuser.

SUMMARY

A variable diffuser includes a backing plate, a shroud, a diffuser body between the backing plate and the shroud, a plurality of passages through the diffuser body, and a valve adjacent to the shroud and the diffuser body, wherein the valve movably occludes a portion of the plurality of passages.

A compressor includes a compressor housing with an inlet, an outlet, and a duct connecting the inlet to the outlet; an impeller within the duct in the compressor housing; and variable diffuser. The variable diffuser includes a backing plate, a shroud, a diffuser body between the backing plate and the shroud, a plurality of passages through the diffuser body, and a valve adjacent to the shroud and the diffuser body. The valve movably occludes a portion of the plurality of passages.

DETAILED DESCRIPTION

A variable channel diffuser can include a diffuser body with multiple passages and a valve to control flow through the passages. The valve can be actuated to obstruct certain passages while allowing air flow through other passages. The use of multiple passages controlled by a valve allows for the elimination of vanes (which are costly to produce and assemble) and reduces weight and part count of the diffuser system.

Figure 1A:
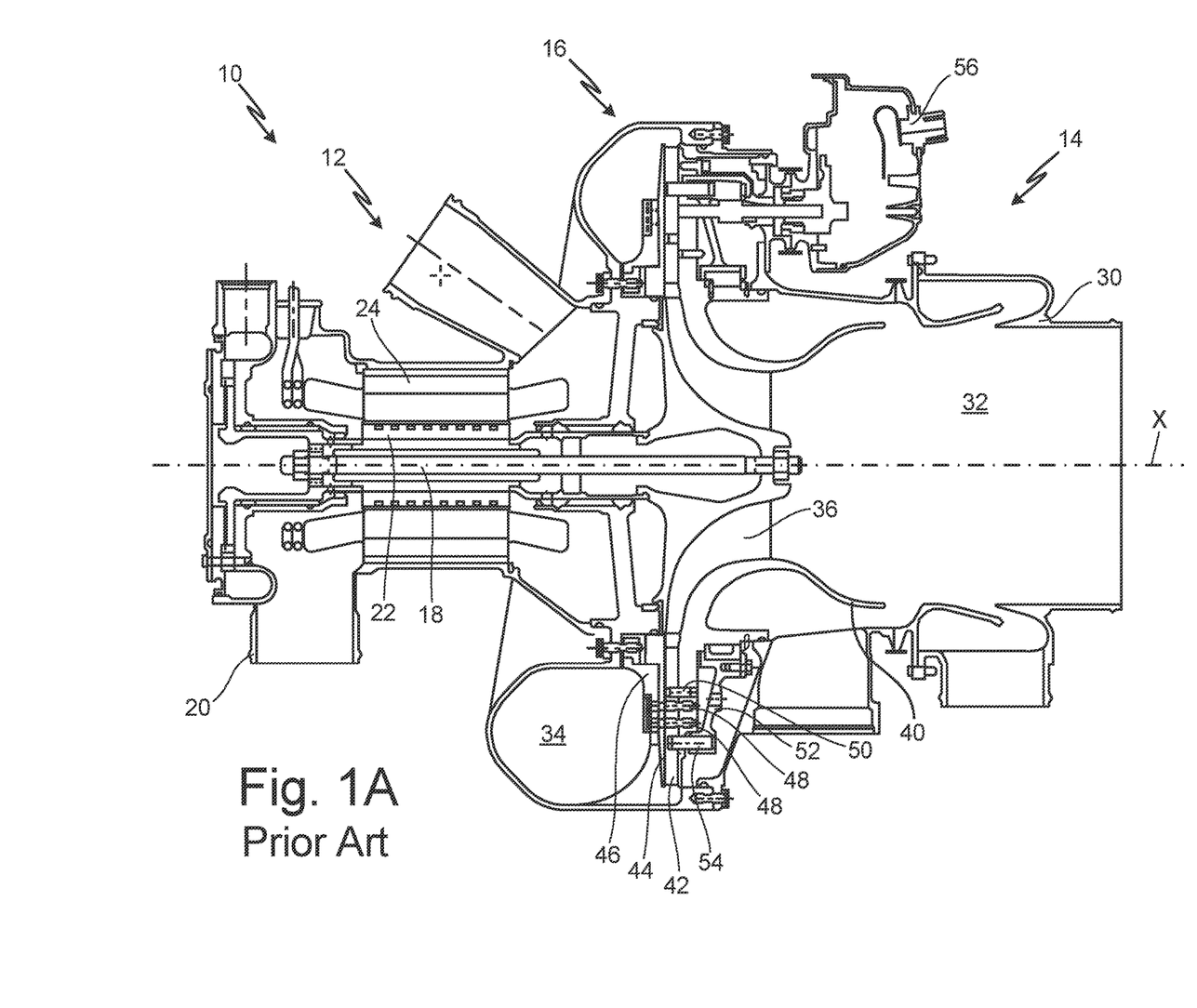
FIG. 1A is cross-sectional view of an air compressor with a prior art air variable diffuser.
Figure 1B:
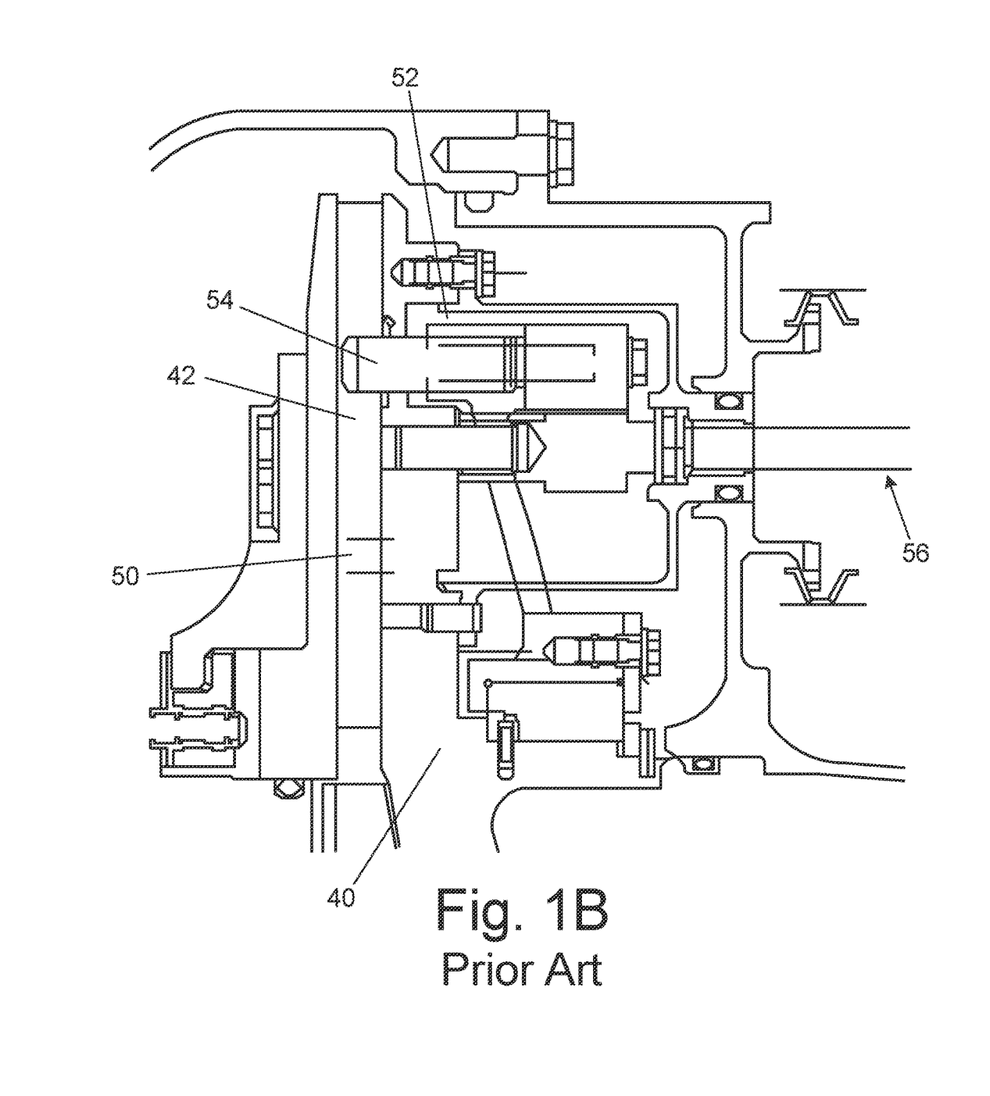
FIG. 1B is a cut-away cross-sectional view of the air compressor focused on the prior art variable diffuser.

FIG. 1A is cross-sectional view of prior art air compressor 10 with prior art variable diffuser 16. FIG. 1B is a cut-away cross-sectional view of prior art air compressor 10 focused on the prior art prior art variable diffuser 16. FIGS. 1A-1B will be discussed together. Prior art air compressor 10 includes motor 12, compressor section 14, prior art variable diffuser 16, and tie rod 18. Also shown in FIG. 1 is axis X. Motor 12 drives compressor section 14 in prior art air compressor 10. Air enters compressor section 14 and then flows through prior art variable diffuser 16 before exiting compressor section 14. Tie rod 18 extends through prior art air compressor 10 and is centered on axis X. Motor 12 and compressor section 14 are mounted to tie rod 18. Motor 12 drives tie rod 18 and causes it to rotate, which in turn rotates compressor section 14.

Motor 12 includes motor housing 20, motor rotor 22, and motor stator 24. Motor housing 20 surrounds motor rotor 22 and motor stator 24. Motor 12 is an electric motor with motor rotor 22 disposed within motor stator 24. Motor rotor 22 is rotatable about axis X. Motor rotor 12 is mounted to tie rod 18 to drive rotation of tie rod 18 in prior art air compressor 10.

Compressor section 14 includes compressor housing 30, compressor inlet 32, compressor outlet 34, and compressor rotor 36. Compressor housing 30 includes a duct that forms compressor inlet 32 and a duct that forms compressor outlet 34. Compressor inlet 32 draws air into compressor section 14. One source of air is ram air collected from a ram air scoop positioned along the aircraft body. Compressor rotor 36 is positioned in compressor housing 30. Compressor rotor 36 is driven with motor 12 and is mounted on tie rod 18 to rotate with tie rod 18 about axis X. Air that is drawn into compressor section 14 through compressor inlet 32 is compressed with compressor rotor 36. The compressor air is then routed through prior art variable diffuser 16 before exiting compressor section 14 through compressor outlet 34.

Prior art variable diffuser 16 includes shroud 40, vanes 42, backing plate 44, mounting plate 46, fasteners 48, pivot pins 50, drive ring 52, drive pins 54, and diffuser actuator 56. Shroud 40 of prior art variable diffuser 16 can be attached to compressor housing 30. Vanes 42 are positioned between shroud 40 and backing plate 44. Backing plate 44 is held against vanes 42 with mounting plate 46. Fasteners 48 extend through openings in mounting plate 46, backing plate 44, vanes 42, and shroud 40. Vanes 42 are positioned between shroud 40 and backing plate 44 so that there is a small clearance between vanes 42 and shroud 40 and between vanes 42 and backing plate 44.

Pivot pins 50 extend between openings in vanes 42 and openings in shroud 40. Vanes 42 can rotate about pivot pins 50. Drive ring 52 is positioned adjacent shroud 40. Drive pins 54 extend from drive ring 52 through shroud 40 into a slot in vanes 42. Drive ring 52 can be rotated about axis X with diffuser actuator 56. As drive ring 52 is rotated, drive pins 54 engaged in the slots in vanes 42 will drag vanes 42 and cause them to rotate about pivot pins 50. This movement of vanes 42 will vary the gap between adjacent vanes 42 to vary the amount of air flowing between vanes 42.

Varying the amount of air that flows between vanes 42 allows prior art variable diffuser 16 to be used in different settings. First, when an aircraft is positioned on the ground the air that is taken into prior art variable diffuser 16 is typically at a pressure that is suitable for use in the cabin. Vanes 42 can thus be positioned to allow air to flow through prior art variable diffuser 16 without compressing the air. Alternatively, when an aircraft is in flight the air that is taken into prior art variable diffuser 16 is typically at a low pressure that is unsuitable for use in the cabin. Vanes 42 can thus be positioned to compress the air flowing through prior art variable diffuser 16 before that air is routed to an environmental control system.

Figure 2:
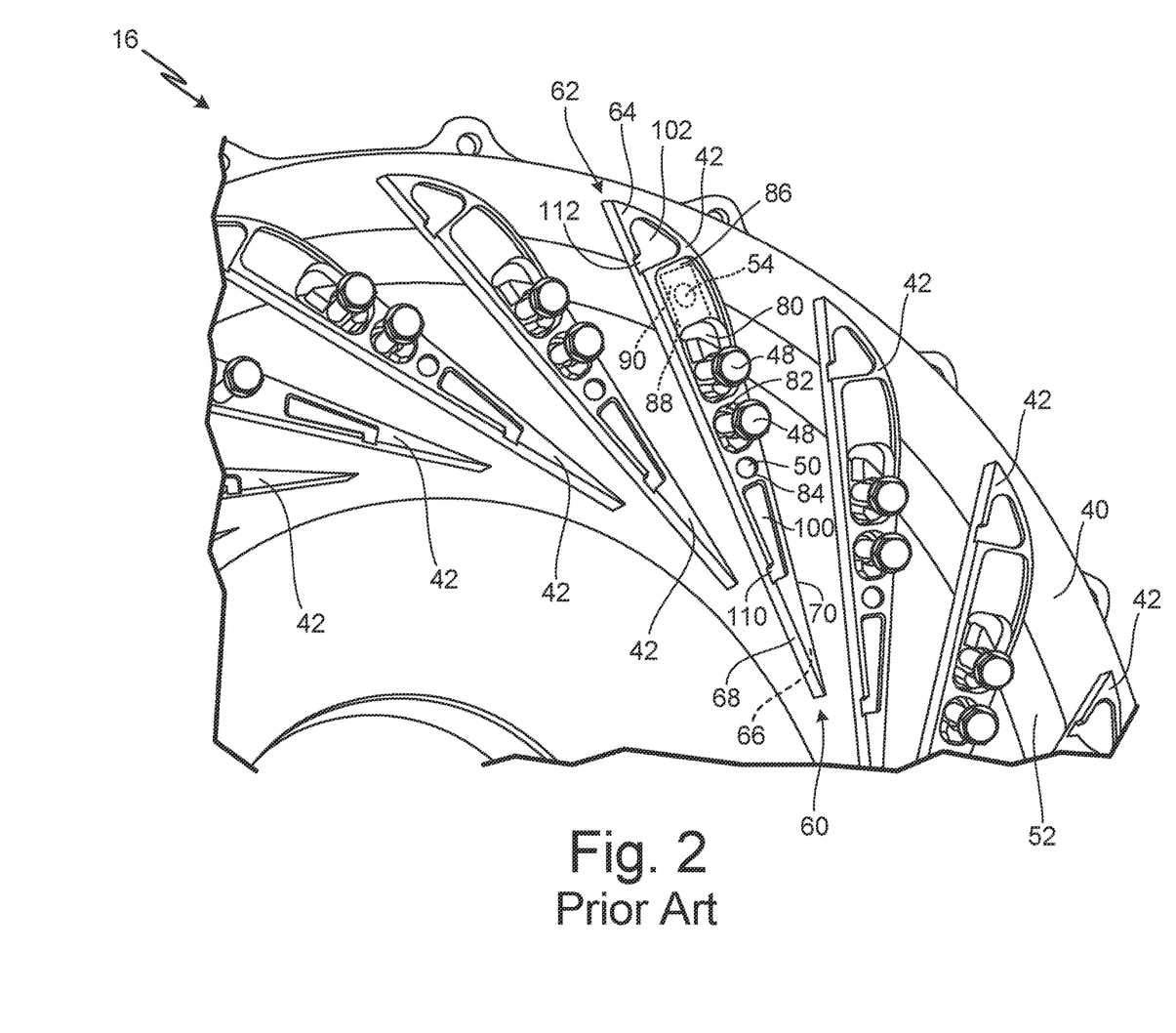
FIG. 2 is a perspective cut-away view of the prior art variable diffuser.

FIG. 2 is a perspective cut-away view of prior art variable diffuser 16. Prior art variable diffuser 16 includes shroud 40, vanes 42, fasteners 48, pivot pins 50, drive ring 52, and drive pins 54. Each vane 42 includes inlet end 60, outlet end 62, first surface 64, second surface 66, leading surface 68, trailing surface 70, first aperture 80, second aperture 82, third aperture 84, first recess 86, second recess 88, slot 90, first cavity 100, second cavity 102, a third cavity (not shown in FIG. 2), a fourth cavity (not shown in FIG. 2), first notch 110, second notch 112, a third notch (not shown in FIG. 2), and a fourth notch (not shown in FIG. 2).

Prior art variable diffuser 16 includes vanes 42 positioned on shroud 40. Fasteners 48 extend through a mounting plate (not shown in FIG. 2), a backing plate (not shown in FIG. 2), vanes 42, and shroud 40 to hold vanes 42 between the backing plate and shroud 40. Pivot pins 50 extend through vanes 42 and shroud 40 so that vanes 42 can pivot about pivot pins 50. Drive ring 52 is positioned adjacent shroud 40 and has a retaining ring that extends up to be flush with the surface of shroud 40 that abuts vanes 42. Drive pins 54 extend from drive ring 52 into vanes 42 to engage vanes 42. Drive ring 52 can be rotated, causing drive pins 54 to rotate vanes 42.

Vanes 42 are pivotally positioned in prior art variable diffuser 16. Each vane 42 includes inlet end 60 positioned radially inward in relation to prior art variable diffuser 16 and outlet end 62 positioned radially outward in relation to prior art variable diffuser 16. Each vane 42 also includes first surface 64 and second surface 66 extending from inlet end 60 to outlet end 62. First surface 64 abuts the backing plate 44 (shown in FIG. 1A) and second surface 64 abuts shroud 40. Each vane 42 also includes leading surface 68 and trailing surface 70 extending from inlet end 60 to outlet end 62. Leading surface 68 faces radially inward in relation to prior art variable diffuser 16 and trailing surface 70 faces radially outward in relation to prior art variable diffuser 16.

Each vane 42 includes first aperture 80 and second aperture 82 extending from first surface 64 to second surface 66. First aperture 80 receives one fastener 48 and second aperture 82 receives one fastener 48. First aperture 80 and second aperture 82 are sized so that first aperture 80 and second aperture 82 do not limit the movement of vane 42 when it pivots.

Each vane 42 also includes third aperture 84 extending from first surface 64 to second surface 66. Third aperture 84 is sized to receive pivot pin 50. Vanes 42 pivot on pivot pins 50. Each vane 42 further includes first recess 86, second recess 88, and slot 90. First recess 86 is positioned on first surface 64 of vane 42. Second recess 88 is positioned on second surface 66 of vane 42. Second recess 88 is positioned around slot 90. Slot 90 extends a distance into vane 42 from second surface 66. Slot 90 is sized to slidably engage drive pin 54. As drive ring 52 rotates, drive pins 54 can slide through slots 90 to rotate vanes 42 about pivot pins 50.

Each vane 42 further includes first cavity 100, second cavity 102, a third cavity, and a fourth cavity. First cavity 100 and second cavity 102 are positioned on first surface 64. The third cavity and the fourth cavity are positioned on second surface 66. The third cavity and the fourth cavity are not shown in FIG. 2, as the third cavity is positioned below first cavity 100 on second surface 66 facing shroud 40 and the fourth cavity is positioned below second cavity 102 on second surface 66 facing shroud 40. Vane 42 further includes first notch 110, second notch 112, a third notch, and a fourth notch. First notch 110 in on first surface 64 and extends from leading surface 68 to first cavity 100. Second notch 112 is on first surface 64 and extends from leading surface 68 to second cavity 102. The third notch is on second surface 66 and extends from trailing surface 70 to the third cavity. The fourth notch is on second surface 66 and extends from trailing surface 70 to the fourth cavity. The third notch and the fourth notch are not shown in FIG. 2, as they are positioned on second surface 66 facing shroud 40.

First cavity 110, second cavity 112, the third cavity, and the fourth cavity are included on vane 42 to load vane 42 against the backing plate (not shown in FIG. 2) to prevent vanes 42 from dithering, vibrating, and resonating. First notch 110, second notch 112, the third notch, and the fourth notch are included on vane 42 to vent first cavity 100, second cavity 102, the third cavity, and the fourth cavity, respectively. This allows air that is flowing through prior art variable diffuser 16 to flow into first cavity 100, second cavity 102, the third cavity, and the fourth cavity through first notch 110, second notch 112, the third notch, and the fourth notch, respectively. First cavity 100, second cavity 102, the third cavity, and the fourth cavity are vented to different pressures to create the load that holds vane 42 against the backing plate.

Figure 3:
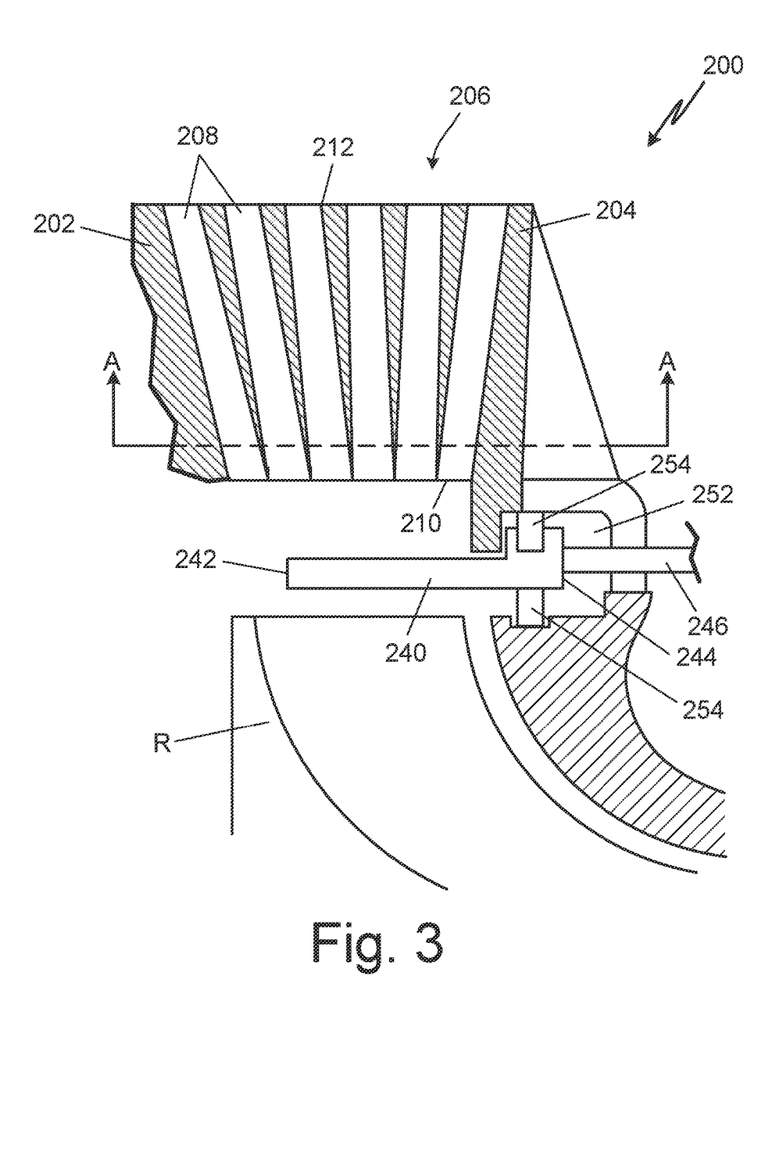
FIG. 3 is a schematic cut-away cross-sectional view of an air compressor with a variable pipe diffuser.

FIG. 3 is a schematic cut-away cross-sectional view of variable pipe diffuser 200. Variable pipe diffuser 200 includes backing plate 202 (such as backing plate 44 shown in FIGS. 1A-2), shroud 204 (such as shroud 40 shown in FIGS. 1A and 2), diffuser body 206, passages 208, inlet portion 210, and outlet portion 212. Variable pipe diffuser 200 also includes valve 240, with first end 242 and second end 244, actuator 246, cavity 252, and seals 254. FIG. 3 also includes rotor R (such as compressor rotor 36 shown in FIGS. 1A-1B) which is situated upstream from variable pipe diffuser 200.

Variable channel diffuser 200 has backing plate 202 at a first side and across from shroud 204 at a second side. Diffuser body 206 is between backing plate 202 and shroud 204. Diffuser body has many passages 208 through diffuser body Passages 208 are packed close together in diffuser body 206 and are generally frustoconical. Passages 208 also diverge from one another along the length of diffuser body 206. Passages 208 run from an inlet portion 210 to an outlet portion 212. Passages 208 are narrower at inlet portion 210 than at outlet portion 212. Inlet portion 210 is downstream from compressor rotor R. Diffuser portion 206 of variable pipe diffuser 200 can be cast or additively manufactured from lightweight metals, like aluminum.

Valve 240 is between rotor R and diffuser body 206, adjacent to inlet portion 210. Alternatively, valve 240 can be adjacent to outlet portion 212 of diffuser body 206. Valve 240 can be a poppet valve. Placing valve 240 adjacent to outlet portion 212 creates containment for rotor R and makes it easier to fit and repair valve 240 in an air compressor. First end 242 of valve 240 is a long thin end and second end 244 is a wider head. Second end 244 of valve 240 can attach to actuator 246 with a linkage. Cavity 252 is a compartment protecting the linkage to actuator 246 and gives room for valve 240 to translate. Seals 254 near second end 244 of valve create cavity 252.

Variable pipe diffuser 200 operates in a similar manner as prior art vaned diffuser 16 (described above in reference to FIGS. 1A-2). Variable pipe diffuser 200 receives airflow at inlet portion 210 (for example, compressor inlet 32 shown in FIG. 1A) after the airflow has passed through rotor R (for example, compressor rotor 36 shown in FIG. 1A). The air is then diffused as it travels through passages 208 in variable pipe diffuser 200 to diffuser outlet portion 212.

Varying airflow through variable pipe diffuser 200 is accomplished through moving valve 240 to open different numbers of passages 208. Valve 240 can move between an open position and an occluded position. In the open position, second end 242 of valve is adjacent to shroud 204. In the open position, all passages 208 are open and air can flow through them. The fully occluded position is shown in FIG. 3. In the fully occluded position, second end 242 of valve 240 is extended as far as allowed between rotor R and inlet portion 210 of diffuser portion 206. Almost all passages 208 are occluded and air cannot flow through. Valve 240 can move anywhere between the open position and the fully occluded position to occlude different numbers of passages 208. Valve 240 Actuator 246 moves valve 240 to different positions depending on the need for compressed air in an aircraft. Actuator 246 can be aided with servo pressure, or alternatively, servo pressure alone can be used to move valve 240, as will be discussed in relation to FIG. 6.

As discussed in relation to FIGS. 1A-1B, changing the number of passages 208 open allows for variable pipe diffuser 200 to run in many different modes depending on the needs of the aircraft. For example, when the aircraft is on the ground and the ambient air pressure is suitable for an aircraft cabin, valve 240 can be in the fully occluded position and only a few passages 208 allow airflow through. When an aircraft is taking off, landing, or in flight, ambient pressure decreases and valve 240 can move toward the open position or into the open position to allow air compression through variable pipe diffuser 200. Variable pipe diffuser 200 includes fewer parts than prior art variable diffuser 16. For example, diffuser body 206 is one piece resulting in easier assembly and reduced maintenance cost for an air compressor utilizing variable pipe diffuser 200. Passages 208 have little to no loss between individual passages, increasing efficiency. Variable pipe diffuser 200 can also provide containment for rotor R.

Figure 4:
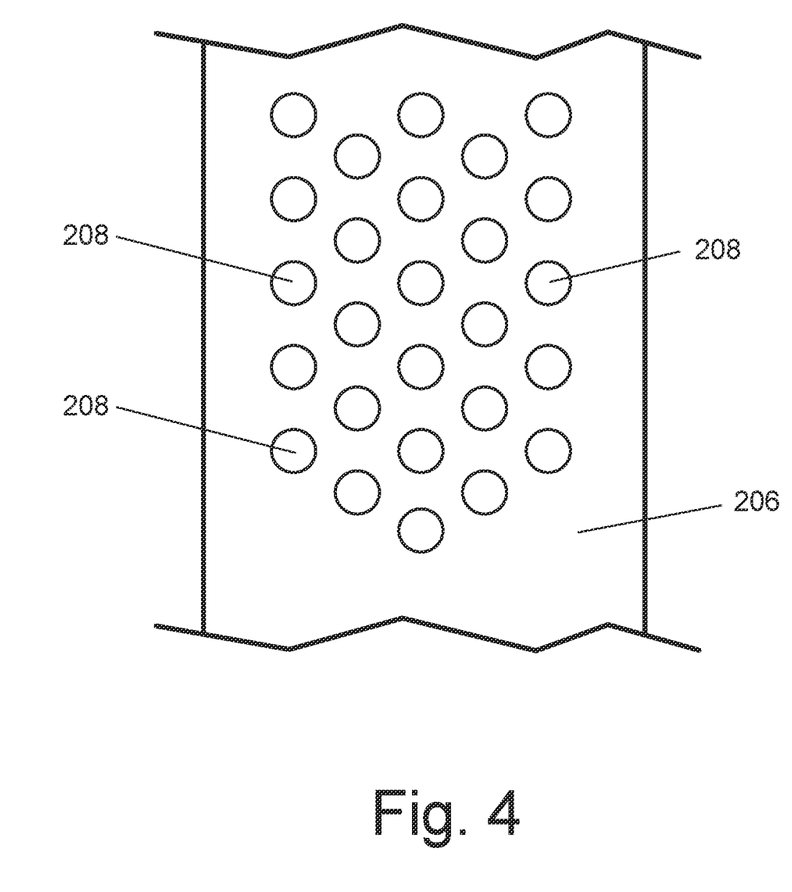
FIG. 4 is a schematic cross-sectional view of the variable pipe diffuser taken along line A-A of FIG. 3.

FIG. 4 is a schematic cross-sectional view of the variable pipe diffuser taken along line A-A of FIG. 3. FIG. 4 includes diffuser body 206 and passages 208. Passages 208 are packed very closely in diffuser body 206. Multiple rows and columns of passages 208 are present in diffuser body 206. Passages 208 are shown in an offset grid pattern in FIG. 4. However, other patterns are possible. Having many passages 208 increases the granularity and allows for finer control of the amount of air moving through variable pipe diffuser 200.

Figure 5:
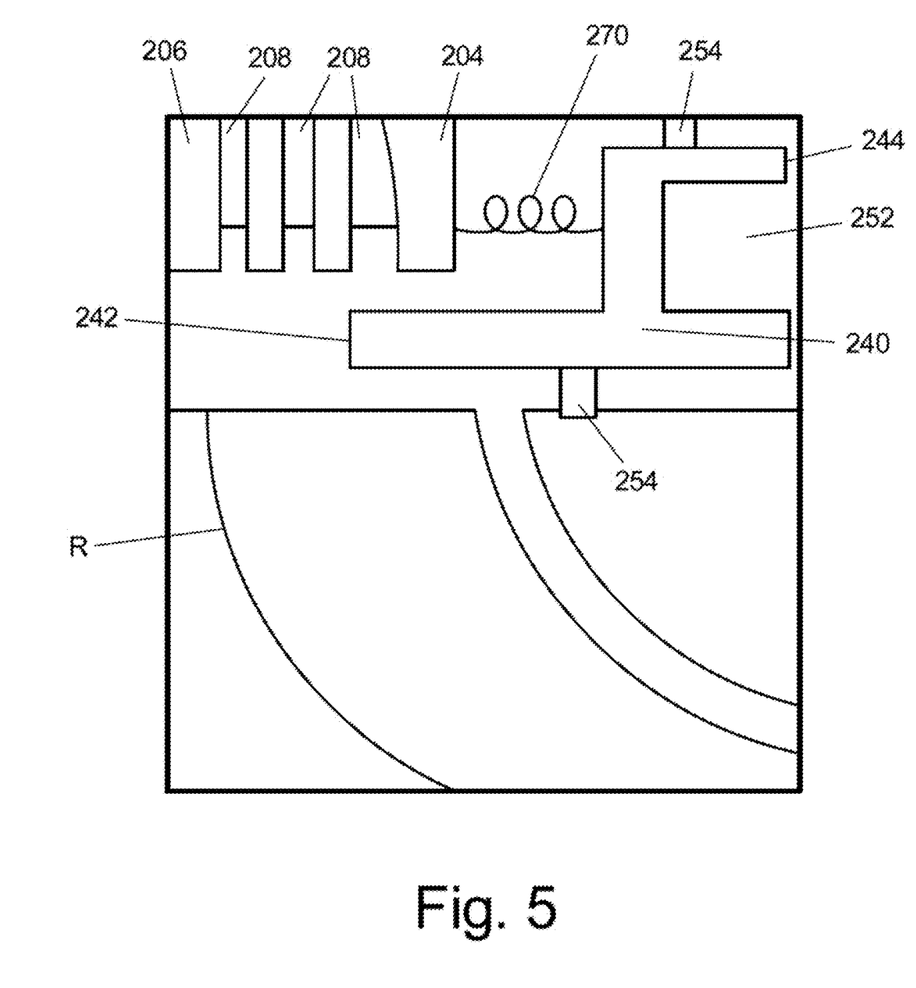
FIG. 5 is schematic depiction of a valve in the variable diffuser of FIG. 3.

FIG. 5 is a schematic depiction of valve 240 in variable pipe diffuser 200. FIG. 5 includes shroud 204, diffuser body 206, passages 208, valve 240 (with first end 242 and second end 244), cavity 252, seals 254, and spring 270. FIG. 5 also includes rotor R.

Variable pipe diffuser 200 shown in FIG. 5 has a similar structure and function as variable pipe diffuser 200 in FIG. 3 with respect to shroud 204, diffuser body 206, passages 208, valve 240, cavity 252, and seals 254. An alternative configuration of second end 244 of valve 240 is shown in FIG. 5. Second end 244 of valve 244 has a generally C-shape. One seal 254 abuts a top of second end 244 and a second seal 254 abuts a bottom of second end 244. A center of the C-shape of second end 244 is open to connect a linkage (for example, linkage 246 as shown in FIG. 3) and an actuator arm (for example, actuator arm 248 as shown in FIG. 3). Additionally, the C-shape allows second end 244 of valve 240 to be a poppet valve that can be moved using servo pressure, as will be described in more detail in FIG. 6.

FIG. 5 also shows spring 270, which is positioned between a portion of shroud 204 and second end 244 of valve 240. Spring 270 helps return valve 240 to a default position. The default position could be the fully occluded position or the open position. For example, the default position for valve 240 could be the open position where all of passages 208 are open for airflow. In this example, the default position is set such that spring 270 is compressed when less compressed air is needed for the aircraft, such as when the aircraft is on the ground and ambient pressure is sufficient for the aircraft cabin. When spring 270 is fully compressed, valve 240 will be in the fully occluded position and air will flow through passages 208 located close to backing plate 202. When spring 270 is fully relaxed into the default position, valve 240 will be in the open position and air will flow through all passages 208. Spring 270 could be fully relaxed during flight to compress low-pressure ambient air for the aircraft cabin and other systems. Spring 270 can be compressed by use of an actuator (for example, actuator 250, as described in relation to FIG. 3), servo pressure (as will be described below in relation to FIG. 6), or a combination of the two. Using servo pressure reduces wear on the actuator and increase its lifespan. Changing the default setting of spring 240 can program variable pipe diffuser 200 to run in different modes under different circumstances.

Figure 6:
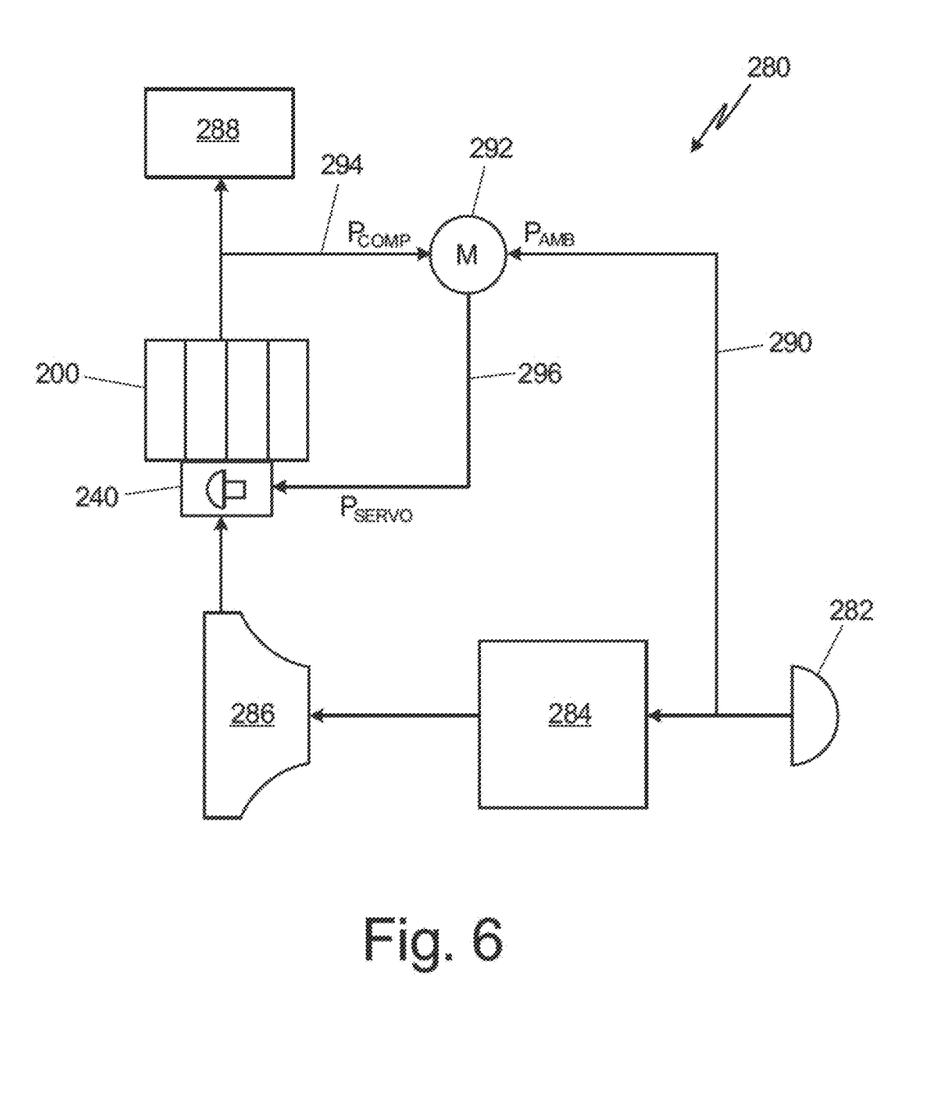
FIG. 6 is a schematic depiction of an air compressor including a variable diffuser having multiple channels.

FIG. 6 is a schematic depiction of air compressor 280 including variable pipe diffuser 200. Air compressor 280 includes ram air scoop 282, compressor housing inlet 284, compressor rotor 286, variable pipe diffuser 200 with valve 240, and compressor housing outlet 288. Air compressor 280 also includes a servo pressure system with ambient pressure air duct 290, motor 292, compressed pressure air duct 294, and servo pressure air duct 296.

Ram air scoop 282 is located along a body of an aircraft and ducts ambient air into compressor 280. Compressor 280 has a compressor housing (for example, compressor housing 30 shown in FIG. 1A). Compressor housing inlet 284, compressor rotor 286, variable pipe diffuser 200 with valve 240, and compressor housing outlet 288 are all located in the compressor housing. Compressor 280 operates similarly to compressor 10, as described in relation to FIGS. 1A-1B. Compressor inlet 284 receives air from ram air scoop 282 and moves air toward impeller 286. Air then moves through impeller 286 where velocity increases. Impeller 286 is upstream from variable pipe diffuser 200. Valve 240 moves to determine how many passages 208 (shown in FIGS. 3-4) in variable pipe diffuser 200 are open. Air moves from impeller 286 past valve 240 and into open passages 208 in variable pipe diffuser 200. In variable pipe diffuser 200, air loses velocity and increases in pressure. Compressed air moves out of variable pipe diffuser 200 toward compressor housing outlet 288.

Compressor 280 includes a servo pressure system to control valve 240 using servo pressure. Ambient pressure air duct 290 connects ram air scoop 282 with motor 292. Compressed pressure air duct 294 connects a portion of the compressor housing downstream from variable pipe diffuser 200 with motor 292. Alternatively, compressed pressure air duct 294 could use air from a heat exchanger downstream of compressor 280. Servo pressure air duct 296 connects motor 292 to valve 240. Motor 292 can be a torque motor and can also include an orifice. Motor 292 combines air at an ambient pressure (PAMB) with air at a compressed pressure (PCOMP). Ambient pressure depends on the altitude of the aircraft. Compressed pressure depends on how many channels are open. Motor 292 creates air at a servo pressure (PSERVO) by mixing ambient pressure air and compressed pressure air. Servo pressure air duct 294 moves air at a servo pressure (PSERVO) to control valve 240.

Air at a servo pressure (PSERVO) can be used to move valve 240. Servo pressure air duct 296 can connect to a cavity with valve 240 (for example, cavity 252 in FIGS. 3-4). When servo pressure is higher than pressure within the compressor housing between rotor 286 and variable pipe diffuser 200, then servo pressure can drive valve 240 to move between various positions (for example, the open position and the fully occluded position, as discussed in relation to FIG. 3). Servo pressure can also be used with an actuator (for example, actuator 250 in FIG. 3) to help reduce the load on the actuator, thus increasing the actuator lifespan.

A variable pipe diffuser as described herein provides numerous advantages. The number of wear surfaces are greatly reduced as compared to a diffuser including vanes. Time and costs relating to manufacturing, assembly, and maintenance can be reduced due to a lower number of parts. Finally, the use of a variable pipe diffuser can decrease system weight as compared to conventional vaned diffusers.

DISCUSSION OF POSSIBLE EMBODIMENTS

The following are non-exclusive descriptions of possible embodiments of the present invention.

A variable diffuser includes a backing plate, a shroud, a diffuser body between the backing plate and the shroud, a plurality of passages through the diffuser body, and a valve adjacent to the shroud and the diffuser body. The valve movably occludes a portion of the plurality of passages.

The variable diffuser of the preceding paragraph can optionally include, additionally and/or alternatively, any one or more of the following features, configurations and/or additional components:

A further embodiment of the foregoing variable diffuser, wherein the plurality of passages are frustoconical passages.

A further embodiment of any of the foregoing variable diffusers, wherein the plurality of passages are diverging passages.

A further embodiment of any of the foregoing variable diffusers, wherein each passage in the plurality of passages includes an inlet with an inlet diameter and an outlet with an outlet diameter. The inlet diameter is smaller than the outlet diameter.

A further embodiment of any of the foregoing variable diffusers, wherein the valve is adjacent to the inlets of the passages.

A further embodiment of any of the foregoing variable diffusers, wherein the valve is adjacent to the outlets of the passages.

A further embodiment of any of the foregoing variable diffusers, wherein the valve is a poppet valve.

A further embodiment of any of the foregoing variable diffusers, wherein the valve is connected to a servo pressure duct which provides air at a servo pressure to move the valve.

A further embodiment of any of the foregoing variable diffusers, wherein the valve is controlled by a linear actuator connected to the valve by a linkage.

A compressor includes a compressor housing, an impeller in the compressor housing, and a variable diffuser. The compressor housing includes an inlet, an outlet and a duct connecting the inlet to the outlet. The impeller is within the duct. The variable diffuser is within the duct and downstream from the impeller. The variable diffuser includes a backing plate, a shroud, a diffuser body between the backing plate and the shroud, a plurality of passages through the diffuser body, and a valve adjacent to the diffuser body. Each passage has an inlet and an outlet. The valve movably obstructs a portion of the plurality of passages.

The compressor of the preceding paragraph can optionally include, additionally and/or alternatively, any one or more of the following features, configurations and/or additional components:

A further embodiment of the foregoing compressor, wherein the inlets of the plurality of passages through the diffuser body are smaller than the outlets of the plurality of passages.

A further embodiment of any of the foregoing compressors, wherein the plurality of passages are frustoconical and the plurality of passages diverge from one another.

A further embodiment of any of the foregoing compressors, wherein the valve obstructs a portion of the inlets of the plurality of passages.

A further embodiment of any of the foregoing compressors, wherein the valve obstructs a portion of the outlets of the plurality of passages.

A further embodiment of any of the foregoing compressors, wherein the valve is a poppet valve.

A further embodiment of any of the foregoing compressors, wherein the valve is controlled by a linear actuator.

A further embodiment of any of the foregoing compressors, wherein the valve is connected to a servo pressure system which provides air at a servo pressure to move the valve.

A further embodiment of any of the foregoing compressors, wherein the servo pressure system includes a motor with an input and an output, an ambient pressure duct connecting a ram air source and the motor input, a compressed pressure duct connecting a portion of the compressor housing duct downstream from the variable diffuser with the motor input, and a servo pressure duct connecting the motor output with the poppet valve. The motor combines air from the ambient pressure duct with air from the compressed pressure duct to create air with servo pressure.

A further embodiment of any of the foregoing compressors, wherein the motor is chosen from the group consisting of a torque motor, an orifice, and combinations thereof.

A further embodiment of any of the foregoing compressors, wherein the valve is controlled by a linear actuator and servo pressure.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A variable diffuser comprising:
a backing plate;
a shroud;
a diffuser body extending axially between the backing plate and the shroud;
a plurality of passages extending through the diffuser body from an inlet at a first end to an outlet at a second end, the plurality of passages spaced axially between the backing plate and the shroud and spaced circumferentially, wherein passages of the plurality of passages are frustoconical in shape, having an inlet diameter smaller than an outlet diameter, and wherein adjacent passages diverge axially from each other; and
a valve adjacent to the shroud and the diffuser body, wherein the valve movably occludes a portion of the plurality of passages.

2. The variable diffuser of claim 1, wherein the valve is adjacent to the inlets of the passages.

3. The variable diffuser of claim 1, wherein the valve is adjacent to the outlets of the passages.

4. The variable diffuser of claim 1, wherein the valve is a poppet valve.

5. The variable diffuser of claim 4, wherein the valve is connected to a servo pressure duct which provides air at a servo pressure to move the valve.

6. The variable diffuser of claim 1, wherein the valve is controlled by a linear actuator connected to the valve by a linkage.

7. The variable diffuser of claim 1, wherein the passages of the plurality of passages are arranged in axially extending rows and circumferentially extending columns and wherein the valve movably occludes one or more columns of passages.

8. The variable diffuser of claim 1, wherein passages in adjacent rows are axially offset.

9. A compressor comprising:
a compressor housing comprising:
an inlet;
an outlet; and
a duct connecting the inlet to the outlet;
an impeller within the duct in the compressor housing; and
a variable diffuser within the duct and downstream from the impeller, the variable diffuser comprising:
a backing plate;
a shroud;
a diffuser body extending axially between the backing plate and the shroud;
a plurality of passages extending through the diffuser body from an inlet at a first end to an outlet at a second end, the plurality of passages spaced axially between the backing plate and the shroud and spaced circumferentially, wherein passages of the plurality of passages are frustoconical in shape, having an inlet diameter smaller than an outlet diameter, and wherein adjacent passages diverge axially from each other; and
a valve adjacent to the diffuser body, wherein the valve movably obstructs a portion of the plurality of passages.

10. The compressor of claim 9, wherein the valve obstructs a portion of the inlets of the plurality of passages.

11. The compressor of claim 9, wherein the valve obstructs a portion of the outlets of the plurality of passages.

12. The compressor of claim 9, wherein the valve is a poppet valve.

13. The compressor of claim 9, wherein the valve is controlled by a linear actuator.

14. The compressor of claim 9, wherein the valve is connected to a servo pressure system which provides air at a servo pressure to move the valve.

15. The compressor of claim 14, wherein the servo pressure system comprises:
a motor with an input and an output;
an ambient pressure duct connecting a ram air source and the motor input;
a compressed pressure duct connecting a portion of the compressor housing duct downstream from the variable diffuser with the motor input; and
a servo pressure duct connecting the motor output with a poppet valve;
wherein the motor combines air from the ambient pressure duct with air from the compressed pressure duct to create air with servo pressure.

16. The compressor of claim 15, wherein the motor is a torque motor.

17. The compressor of claim 15, wherein the valve is controlled by a linear actuator and servo pressure.

18. The compressor of claim 9, wherein the passages of the plurality of passages are arranged in axially extending rows and circumferentially extending columns and wherein the valve movably occludes one or more columns of passages.

19. The compressor of claim 9, wherein passages in adjacent rows are axially offset.

* * * * *